(12) United States Patent
Chen

(10) Patent No.: US 10,146,327 B2
(45) Date of Patent: Dec. 4, 2018

(54) INPUT SYSTEM AND OPERATING METHOD THEREOF

(71) Applicant: Primax Electronics Ltd., Taipei (TW)

(72) Inventor: Hung-Sheng Chen, Taipei (TW)

(73) Assignee: Primax Electronics Ltd., Taipei (TW)

( * ) Notice: Subject to any disclaimer, the term of this patent is extended or adjusted under 35 U.S.C. 154(b) by 0 days.

(21) Appl. No.: 15/498,487

(22) Filed: Apr. 27, 2017

(65) Prior Publication Data

US 2018/0203526 A1    Jul. 19, 2018

(30) Foreign Application Priority Data

Jan. 13, 2017   (TW) .............................. 106101220 A

(51) Int. Cl.
| | |
|---|---|
| *G09G 5/00* | (2006.01) |
| *G06F 3/02* | (2006.01) |
| *G06F 3/033* | (2013.01) |
| *G09G 5/08* | (2006.01) |
| *G06F 3/023* | (2006.01) |
| *G06K 9/00* | (2006.01) |
| *G06F 3/0482* | (2013.01) |

(52) U.S. Cl.
CPC .......... *G06F 3/0238* (2013.01); *G06F 3/0482* (2013.01); *G06K 9/00013* (2013.01); *G06K 9/00087* (2013.01)

(58) Field of Classification Search
CPC ............................ G06K 9/00013; G06F 21/32
See application file for complete search history.

(56) References Cited

U.S. PATENT DOCUMENTS

| | | | | |
|---|---|---|---|---|
| 2006/0210127 A1* | 9/2006 | Kim | ...................... | G06F 3/0237 382/124 |
| 2011/0124376 A1* | 5/2011 | Kim | ...................... | G06F 1/1626 455/566 |
| 2013/0066760 A1* | 3/2013 | Sheldon | .................. | G06Q 40/04 705/37 |
| 2015/0106765 A1* | 4/2015 | Lee | ......................... | G06F 3/0487 715/810 |

* cited by examiner

*Primary Examiner* — Nan-Ying Yang
(74) *Attorney, Agent, or Firm* — Winston Hsu

(57) ABSTRACT

An input system includes a memory unit, a fingerprint detecting unit, an input interface and a processing unit. The memory unit stores n hot-key profiles and n fingerprint files corresponding to the n hot-key profiles. The fingerprint detecting unit reads a fingerprint of a first user and issues a first data corresponding to the fingerprint of the first user. The input interface receives a first hot-key input of the first user. The processing unit is connected with the memory unit, the fingerprint detecting unit and the input interface. The processing unit recognizes the first user according to a result of comparing the first data with the n fingerprint files, selects a first hot-key profile corresponding to the first user from the n hot-key profiles, and converts the first hot-key input into a first function input according to the first hot-key profile.

13 Claims, 7 Drawing Sheets

INPUT SYSTEM AND OPERATING METHOD THEREOF

BACKGROUND OF THE INVENTION

1. Field of the Invention

The present invention relates to an input system, and more particularly to an input system capable of detecting plural fingerprints and selecting profiles to support the hot-key input.

2. Description of the Prior Art

An input device such as a keyboard or a mouse is widely used as an input/output interface of a computer (or a calculator). Via the commercially-available keyboard, mouse or comparable device (e.g., trackball), the user may provide the required input to the computer. However, the conventional input device is not user-friendly.

Take the keyboard for example. In case that the user is a game player or an operator of specified software, the user may repeatedly press a specified combination of plural keys to achieve the required functions. Since the combination of the plural keys is very complicated, the way of repeatedly pressing these keys is troublesome.

For example, "Double Dragon" is a famous video game developed by Technos Japan. For increasing the "health point" of the game character, the user may press the combination of plural keys "↑↑↓↓←←→→BA". Since the game user has to manually input the complicated key combination at each time, the operation is very inconvenient. Moreover, the input action usually fails because of manual mistake. The above problems also exist when other games or application programs are operated. In other words, the use of the conventional input device is neither convenient nor user-friendly.

SUMMARY OF THE INVENTION

In accordance with an aspect of the present invention, there is provided an input system. The input system includes a memory unit, a fingerprint detecting unit, an input interface and a processing unit. The memory unit stores n hot-key profiles and n fingerprint files corresponding to the n hot-key profiles. The fingerprint detecting unit reads a fingerprint of a first user and issues a first data corresponding to the fingerprint of the first user. The input interface receives a first hot-key input of the first user. The processing unit is connected with the memory unit, the fingerprint detecting unit and the input interface. The processing unit recognizes the first user according to a result of comparing the first data with the n fingerprint files, selects a first hot-key profile corresponding to the first user from the n hot-key profiles, and converts the first hot-key input into a first function input according to the first hot-key profile. Each of the n hot-key profiles records m hot-key settings. Each of the m hot-key settings is a macro instruction corresponding to one hot-key input and one function input. Moreover, n and m are integers greater than 1.

In accordance with another aspect of the present invention, there is provided an operating method of an input system. The input system includes a memory unit, a fingerprint detecting unit and an input interface. The memory unit stores n hot-key profiles and n fingerprint files corresponding to the n hot-key profiles. The operating method includes the following steps. Firstly, the fingerprint detecting unit reads a fingerprint of a first user and issues a first data corresponding to the fingerprint of the first user. Then, the first user is recognized according to a result of comparing the first data with the n fingerprint files, and a first hot-key profile corresponding to the first user is selected from the n hot-key profiles. Then, the input interface receives a first hot-key input of the first user. Then, the first hot-key input is converted into a first function input according to the first hot-key profile. Each of the n hot-key profiles records m hot-key settings. Each of the m hot-key settings is a macro instruction corresponding to one hot-key input and one function input. Moreover, n and m are integers greater than 1.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
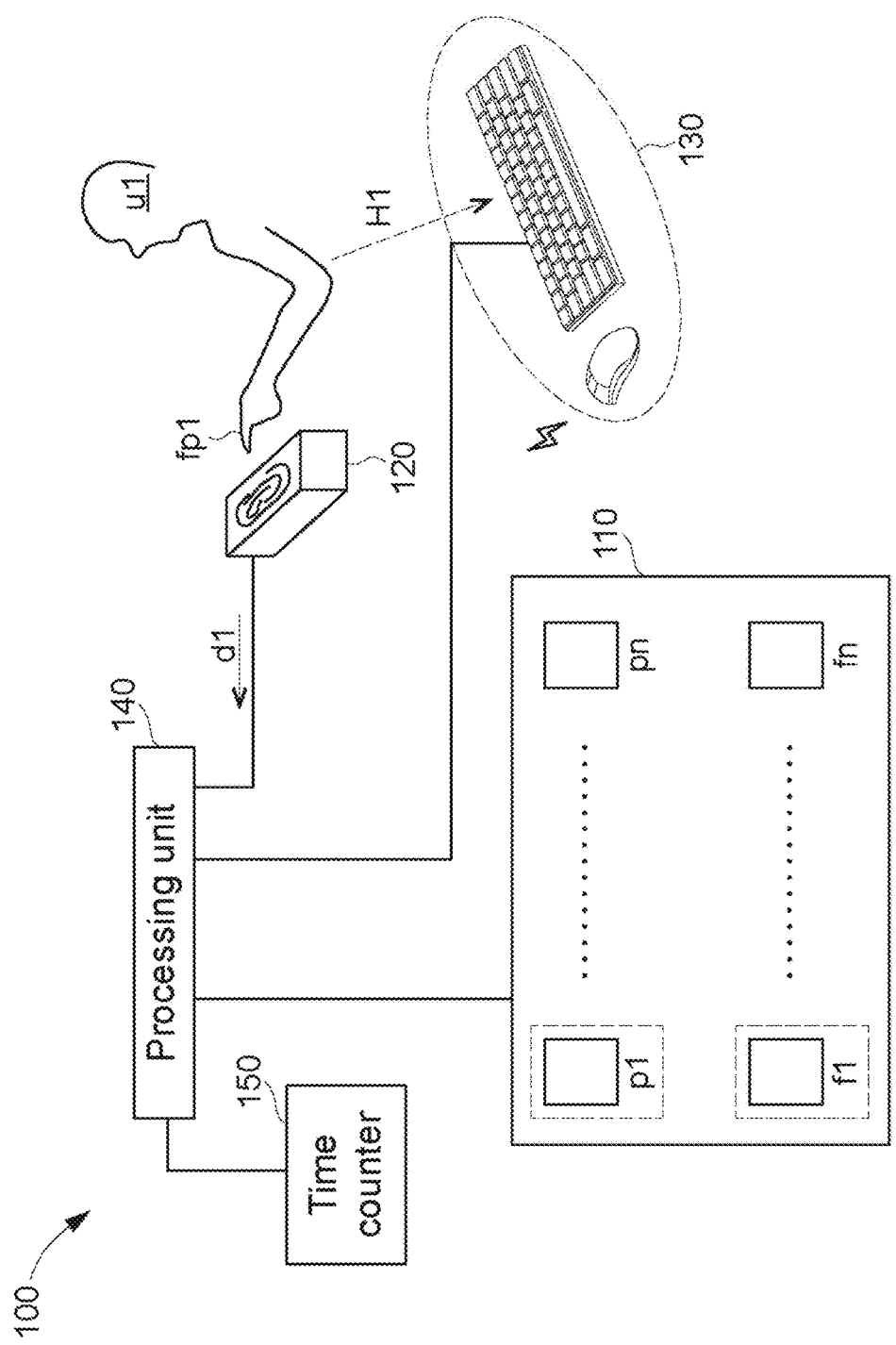
FIG. 1 schematically illustrates an implementation example of an input system according to an embodiment of the present invention.

FIG. 1 schematically illustrates an implementation example of an input system according to an embodiment of the present invention. As shown in FIG. 1, the input system 100 comprises a memory unit 110, a fingerprint detecting unit 120, an input interface 130 and a processing unit 140. The memory unit 110 stores n hot-key profiles p1~pn and n fingerprint files f1~fn corresponding to the n hot-key profiles p1~pn. The hot-key profile p1 corresponds to the fingerprint file f1. The hot-key profile p2 corresponds to the fingerprint file f2. The rest may be deduced by analogy. The fingerprint detecting unit 120 is used for reading fingerprints. In the embodiment as shown in FIG. 1, the fingerprint detecting unit 120 is used for reading the fingerprint fp1 of a first user u1 and issuing a first data d1 corresponding to the fingerprint fp1. An example of the input interface 130 includes but is not limited to a keyboard. The input interface 130 receives a first hot-key input H1 of the first user u1. The processing unit 140 is in communication with the memory unit 110, the fingerprint detecting unit 120 and the input interface 130. By comparing the first data d1 with the n fingerprint files f1~fn, the processing unit 140 recognizes the first user u1. In case that the memory unit 110, the input interface 130 and/or the fingerprint detecting unit 120 are wireless devices (e.g., a wireless keyboard, a wireless mouse, a wireless transmission detector or the like), the processing unit 140 is in communication with the memory unit 110, the input interface 130 and/or the fingerprint detecting unit 120 in a wireless transmission manner.

For example, if n=4, the fingerprint files f1~f4 correspond to the son, the daughter, the father and the mother of a family, respectively. For example, the first user u1 is the son. When the fingerprint fp1 of the user presses on the fingerprint detecting unit 120, the processing unit 140 receives the first data d1 corresponding to the fingerprint fp1 from the fingerprint detecting unit 120. Moreover, the processing unit 140 compares the first data d1 with the fingerprint files f1~f4. If the first data d1 complies with the fingerprint file f1, the processing unit 140 recognizes that the user pressing the fingerprint detecting unit 120 is the first user u1 (e.g., the son) rather than other users (e.g., the daughter, the father and the mother). After the first user u1 is recognized, the processing unit 140 selects a first hot-key profile p1 corresponding to the first user u1 from the n hot-key profiles p1~pn. According to the selected first hot-key profile p1, the processing unit 140 converts the first hot-key input H1 into a first function input F1. For example, the relationship between the first hot-key input H1 and the first function input F1 is listed in Table 1.

TABLE 1

| First hot-key input H1 | First function input F1 |
|---|---|
| @ | ↑↑↓↓←←→→BA |

In this embodiment, when the first user u1 inputs a symbol "@" through the input interface 130 (e.g., a keyboard), the processing unit 140 looks up the first hot-key profile p1 and realizes that the symbol "@" denotes the first hot-key input H1. Then, the processing unit 140 converts the first hot-key input H1 into the first function input F1 (i.e., ↑↑↓↓←←→→BA). Since the first user u1 does not need to manually press the complicated contents of the ↑↑↓↓←←→→BA keys, the efficiency is enhanced and the manual mistake is avoided.

The n hot-key profiles p1~pn as shown in FIG. 1 correspond to n users, e.g., the users u1~un. In the above example, the relationships between the fingerprints, the fingerprint files, the hot-key profiles and the members of the family are listed in Table 2.

TABLE 2

| User (e.g., n = 4) | Fingerprint | Fingerprint file | Hot-key profile |
|---|---|---|---|
| Son (first user u1) | fp1 | f1 | p1 |
| Daughter (second user u2) | fp2 | f2 | p2 |
| Father (third user u3) | fp3 | f3 | P3 |
| Mother (fourth u4) | fp4 | f4 | p4 |

The scenarios of Table 2 are related to different fingerprints of different users. In some special situations, the forefinger fingerprint and the middle finger of the same user corresponding to different hot-key profiles are set. This setting can also be supported by the input system 100.

Moreover, each of the hot-key profiles p1~pn in Table 2 records m hot-key settings. Each hot-key setting is a macro instruction corresponding to one hot-key input and one function input. The parameters n and m are integers greater than 1.

For example, if the parameter m is 18, the hot-key profile p1 contains 18 hot-key settings. These hot-key settings are listed in Table 3.

TABLE 3

| The hot-key settings in the hot-key profile p1 includes: | Hot-key input (inputted by the user through the input interface 130) | Function input |
|---|---|---|
| Hot-key setting 01 | Hot-key input H1: @ | Function input F1: ↑↑↓↓←←→→BA |
| Hot-key setting 02 | Hot-key input H2: # | Function input F2: PPAP (wait for 500 ms) PPAP |
| Hot-key setting 03 | Hot-key input H3: % | Function input F3: double click of left mouse button + keyboard input ggg |
| ... | ... | ... |
| Hot-key setting 17 | Hot-key input H17: a | Function input F17: ↓→P |
| Hot-key setting 18 | Hot-key input H18: z | Function input F18: ↓→↓→P |

In accordance with a feature of the present invention, the input system 110 can be used by plural users u1~un. After the fingerprint of a specified user is sensed, the exclusive hot-key profile of the specified user is employed. Consequently, the specified user can operate the input system 110 more accurately and conveniently.

The input interface 130 as shown in FIG. 1 is not limited to a keyboard. For example, the input interface 130 includes a keyboard, a mouse, a joystick, an audio input device and/or a handheld controller (e.g., a game steering wheel, a game induction gun or a leap motion controller). The hot-key input is determined according to the type of the input interface 130. For example, the action of wielding a sword through the handheld lead motion controller can be set as a hot-key input. Moreover, the content of the function input also contains the action of staying for a specified time interval (e.g., 500 milliseconds).

Figure 3:
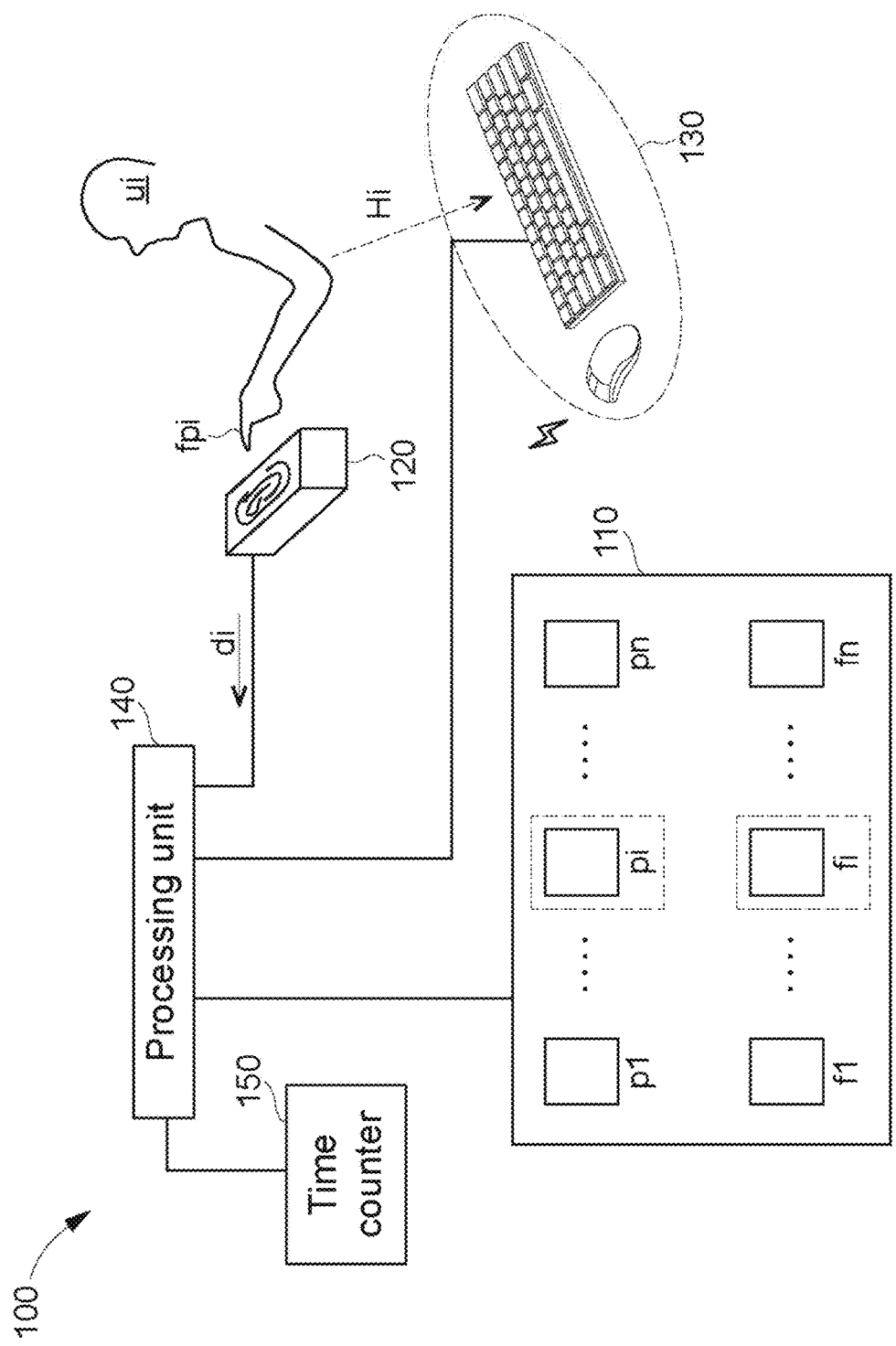
FIG. 3 schematically illustrates another implementation example of the input system according to the embodiment of the present invention.

In an embodiment, the function input corresponding to the hot-key input is an input combination that is executable by many types of input devices. Take the hot-key setting 03 as shown in FIG. 3 for example. When the symbol "%" is inputted by the user, the processing device 140 converts the symbol % into a function input "double click of left mouse button+keyboard input ggg". That is, this function input is the operating combination of two input devices.

Optionally, the input system 100 further comprises a time counter 150. The time counter 150 is in communication with the processing unit 140. After no input is received by the input interface 130, the time counter 150 starts to count time. When an input is received by the input interface 130 again, the time counter 150 stops counting time and the time counter 150 is zeroed. If no input has been received by the input interface 130 for a time period longer than a threshold value according to the counting result of the time counter 150, the processing unit 140 stops using the current hot-key profile. For example, if the son is using the input system 100 to operate a game, the input system 100 selects the first hot-key profile p1. After the son leaves and no input has been received by the input interface 130 (e.g., the keyboard and the mouse) for a time period longer than the threshold value (e.g., 5 minutes), the processing unit 140 stops using the first hot-key profile p1. Consequently, the processing unit 140 enters a default mode, i.e., an initial mode without the hot-key macro instructions. Moreover, the threshold value may be set by the user according to the practical requirements.

Figure 2:
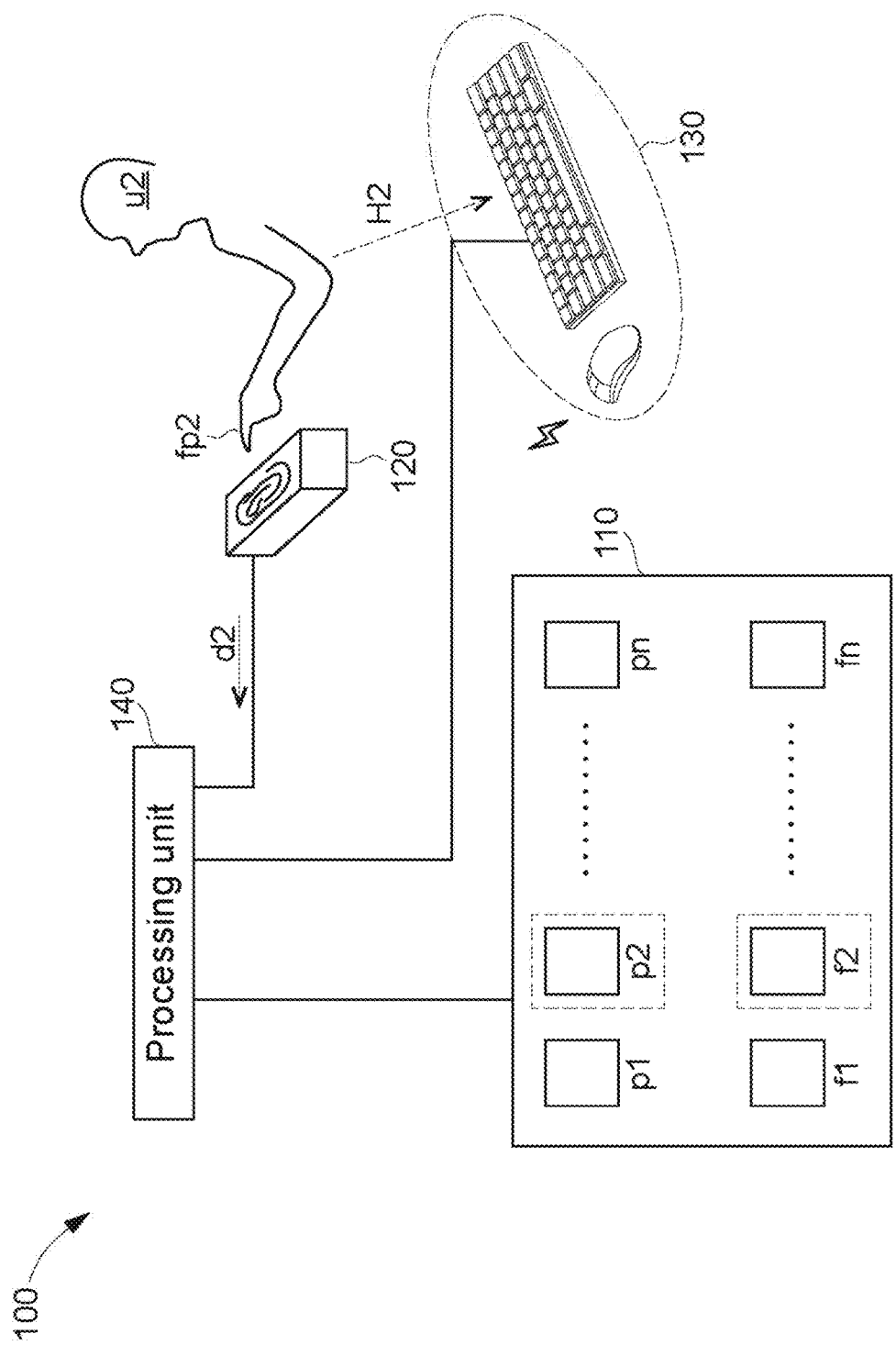
FIG. 2 schematically illustrates another implementation example of the input system according to the embodiment of the present invention.

FIG. 2 schematically illustrates another implementation example of the input system according to the embodiment of the present invention. In this embodiment, the fingerprint detecting unit 120 reads the fingerprint fp2 of a second user u2 and issuing a second data d2 corresponding to the fingerprint fp2. By comparing the second data d2 with the n fingerprint files f1~fn, the processing unit 140 recognizes the first user u2. From the situation of FIG. 1 to the situation of FIG. 2, the processing unit 140 recognizes that the current user is the second user u2 (e.g., the daughter) rather than the first user u1 (e.g., the son). Consequently, the processing unit 140 stops using the first hot-key profile p1 but selects the second hot-key profile p2 corresponding to the second user u2 from the n hot-key profiles p1~pn. The input interface 130 receives a second hot-key input H2 of the second user u2. According to the selected second hot-key profile p2, the processing unit 140 converts the second hot-key input H2 into a second function input. That is, after the user is changed and the fingerprint of the new user is sensed, the input system 100 stops using the original hot-key profile but changes to use the hot-key profile of the new user. Consequently, the new user can use the customized hot-key micro instruction.

In this embodiment, each of the hot-key profiles p1~pn as shown in FIGS. 1 and 2 has a total number of "a" function modes. Each function mode corresponds to "b" hot-key settings. The parameters "a" and "b" are positive integers, wherein "a" and/or "b" is greater than 1. Moreover, the parameter "m" is the product of the parameter "a" and the parameter "b". For example, as shown in Table 4, a=3, b=6, and m=18. That is, each hot-key profile has three function modes, and each function mode corresponds to six hot-key settings. Consequently, there is a total of 18 hot-key settings.

TABLE 4

| Hot-key profile | | |
|---|---|---|
| Function mode | Hot-key input | Function input |
| Function mode 1 | Hot-key input H1 | Function input F1 |
| | ... | ... |
| | Hot-key input H6 | Function input F6 |
| Function mode 2 | Hot-key input H7 | Function input F7 |
| | ... | ... |
| | Hot-key input H12 | Function input F9 |
| Function mode 3 | Hot-key input H13 | Function input F13 |
| | ... | ... |
| | Hot-key input H18 | Function input F18 |

Please refer to Table 3 and Table 4. In the example of Table 4, the hot-key settings are divided into several groups according to the function modes. Consequently, the user can manage the hot-key settings more easily. For example, the hot-key settings commonly used in a first game, a second game and a third game are set in Function mode 1, Function mode 2 and Function mode 3 of the first hot-key profile p1 by the first user u1 (e.g., the son).

In some embodiments, the input system further comprises a user interface (UI). Through the user interface, the user can denominate and manage the hot-key settings or view the contents of the hot-key profiles. Consequently, the input system is more user-friendly. Similarly, the other users can set and view the function modes of the hot-key profiles and the hot-key settings through the user interface.

In an embodiment, the user may selectively disable the undesired function modes through the user interface. For example, when the first game is operated, the user may enable Function mode 1 and disable Function mode 2 and Function mode 3. Under this circumstance, the hot-key inputs of Function 1 are identical to or different from the hot-key inputs of disable Function mode 2 and Function mode 3. Since the hot keys complying with the usual practice of the user are available and the conflictions of using the hot keys are avoided, the input system of the present invention is more user-friendly.

In an embodiment, after the user is identified, the hot-key profile is set to be in an editing mode by the processing unit 140, so that the user is allowed to edit the hot-key profile. For example, after the daughter (i.e., the second user u2) presses the fingerprint fp2 on the fingerprint detecting unit 120, the second user u2 can edit the exclusively hot-key profile p2 through a specified operating interface or command. Similarly, after the other users are identified by the processing unit 140, they can edit their own hot-key profiles.

In an embodiment, the memory unit 110 as shown in FIGS. 1 and 2 is integrated into a host. For example, in case that input system 10 is applied to a home computer, the memory unit 110 is a memory space of a hard disc of the host. For the home user, the input interface 130 is seldom moved to other places. In case that the memory unit 110 is integrated into the host, the hardware requirement of the input device is also reduced.

In another embodiment, the memory unit 110 and the input interface 130 are integrated into an input device. In case that the input interface 130 is a wireless mouse, a flash memory or a random access memory is embedded within the wireless mouse as the memory unit 110. When the wireless mouse is carried by the user and plugged into a different host or notebook computer, the hot-key profiles in the memory unit 110 are also carried by the user. In case that a team worker needs to frequently move to different workplaces, the integration of the memory unit 110 and the input interface 130 into the input device is a feasible scheme.

In an embodiment, the fingerprint detecting unit 120 and the input interface 130 are integrated into the input device in order to facilitate the user to operate. It is noted that the aspects of the present invention are not restricted. For example, the fingerprint detecting unit 120 and the input interface 130 are separated according to the product specifications.

In an embodiment, the input system 100 further comprises a non-transitory computer-readable medium. The processing unit 140 reads the non-transitory computer-readable medium to execute the above operations. For example, the processing unit 140 reads and executes a specified hardware/firmware application program, a driver and the above user interface to perform the above operations. The non-transitory computer-readable medium may be downloaded from the internet or stored in the memory unit 110 according to the product specifications and the practical requirements.

When the input system 100 is first used, the user may execute a specified application program to set the users and create the fingerprint files f1~fn through the user interface. For example, after the members of the family sequentially press their fingerprints, the fingerprint files f1~f4 of the son, the daughter, the father and the mother are created and stored in the memory unit 110.

Figure 4:
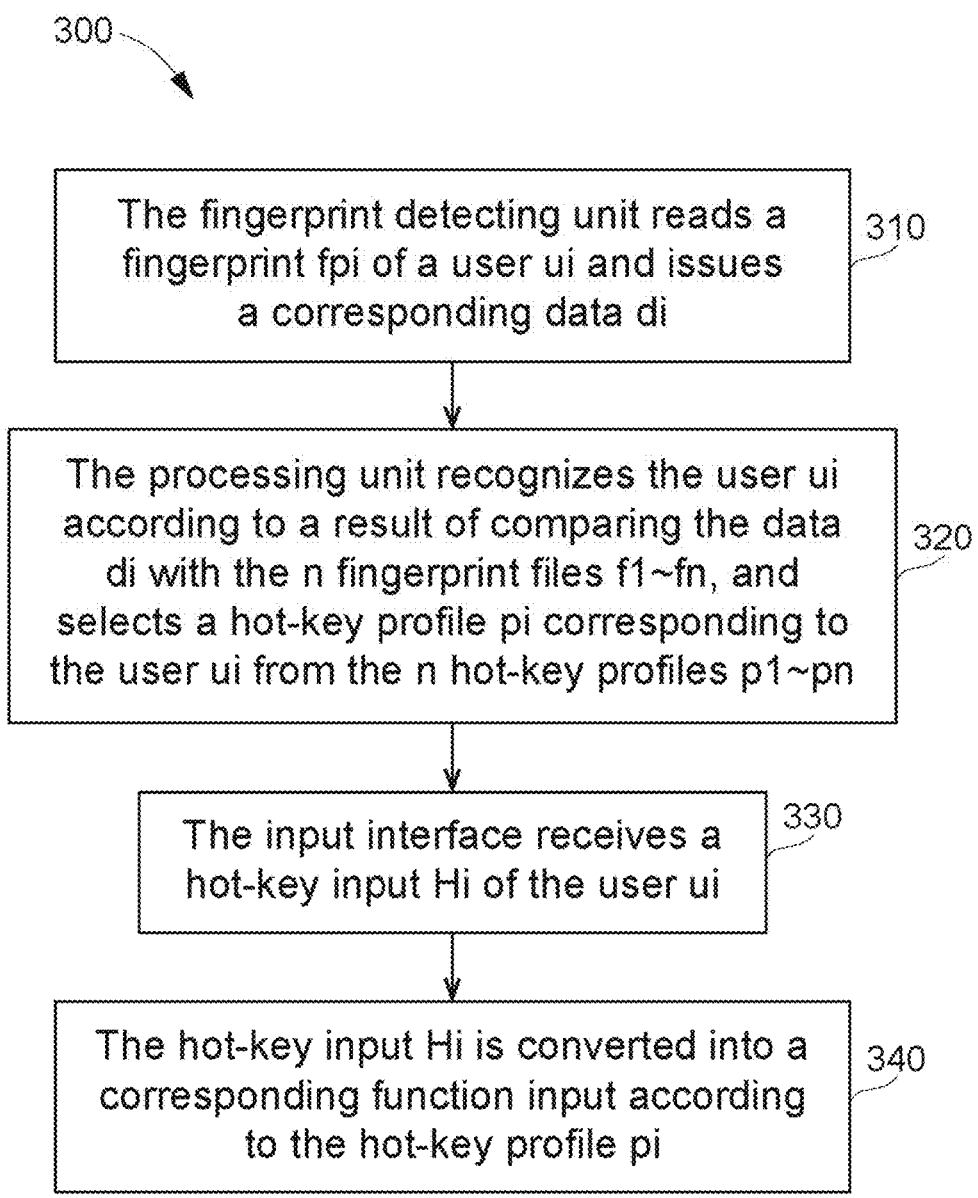
FIG. 4 is a flowchart illustrating an operating method of the input system of FIG. 3.

FIG. 3 schematically illustrates another implementation example of the input system according to the embodiment of the present invention. FIG. 4 is a flowchart illustrating an operating method of the input system of FIG. 3. The operating method 300 comprises the following steps.

In a step 310, the fingerprint detecting unit 120 reads a fingerprint fpi of a user ui and issues a corresponding data di.

In a step 320, the processing unit 140 recognizes the user ui according to a result of comparing the data di with then fingerprint files f1~fn, and selects a hot-key profile pi corresponding to the user ui from the n hot-key profiles p1~pn.

In a step 330, the input interface 130 receives a hot-key input Hi of the user ui.

In a step 340, the hot-key input Hi into a corresponding function input according to the hot-key profile pi.

The parameter "i" is a positive integer, and 1≤i≤n.

Figure 5:
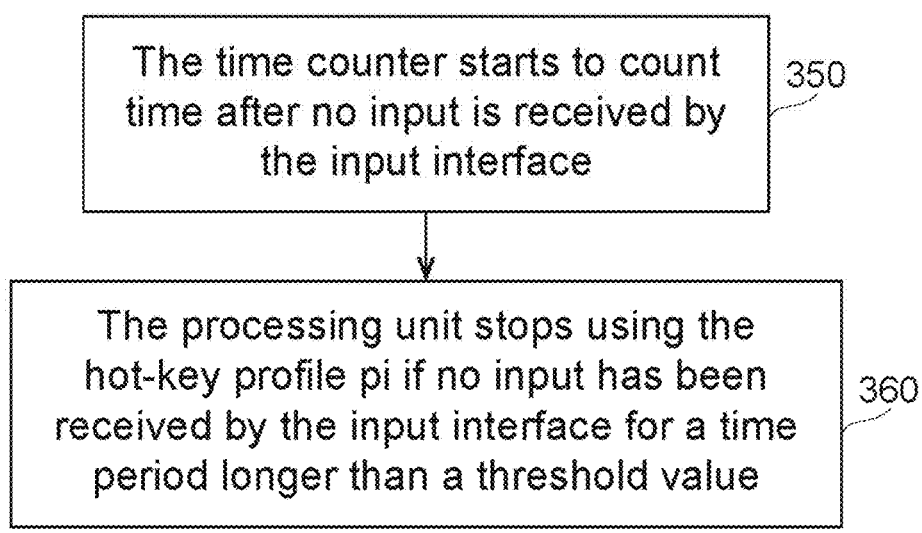
FIG. 5 is a flowchart illustrating a process of stopping using the hot-key profile according to an embodiment of the present invention.

FIG. 5 is a flowchart illustrating a process of stopping using the hot-key profile according to an embodiment of the present invention. Please also refer to FIGS. 3 and 4. The process of FIG. 5 comprises the following steps.

In a step 350, the time counter 150 starts to count time after no input is received by the input interface 130.

In a step 360, the processing unit 140 stops using the hot-key profile pi if no input has been received by the input interface 130 for a time period longer than a threshold value.

The step 350 is selectively performed after the step 340. The principle and example are similar to those mentioned above, and are not redundantly described herein.

Figure 6:
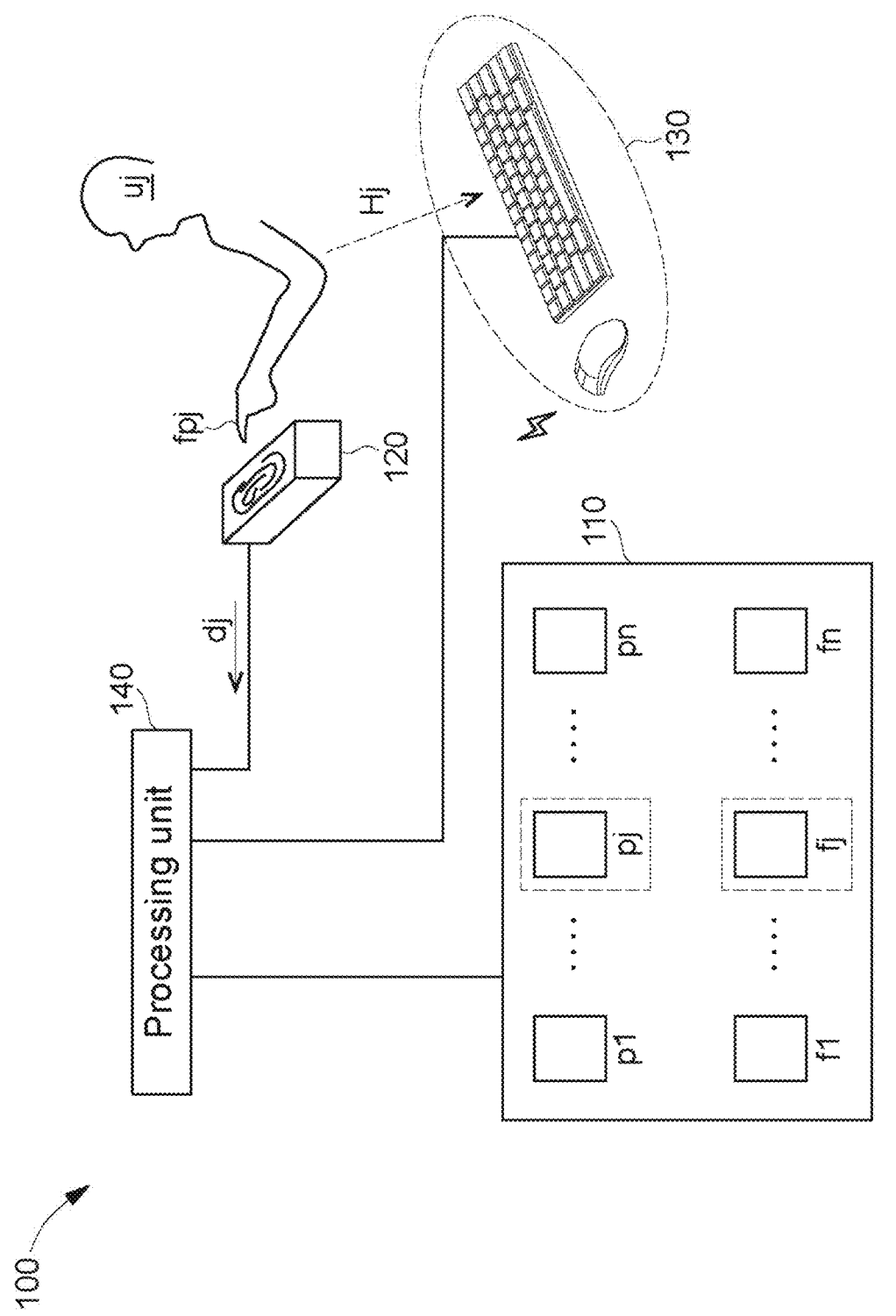
FIG. 6 schematically illustrates another implementation example of the input system according to the embodiment of the present invention.
Figure 7:
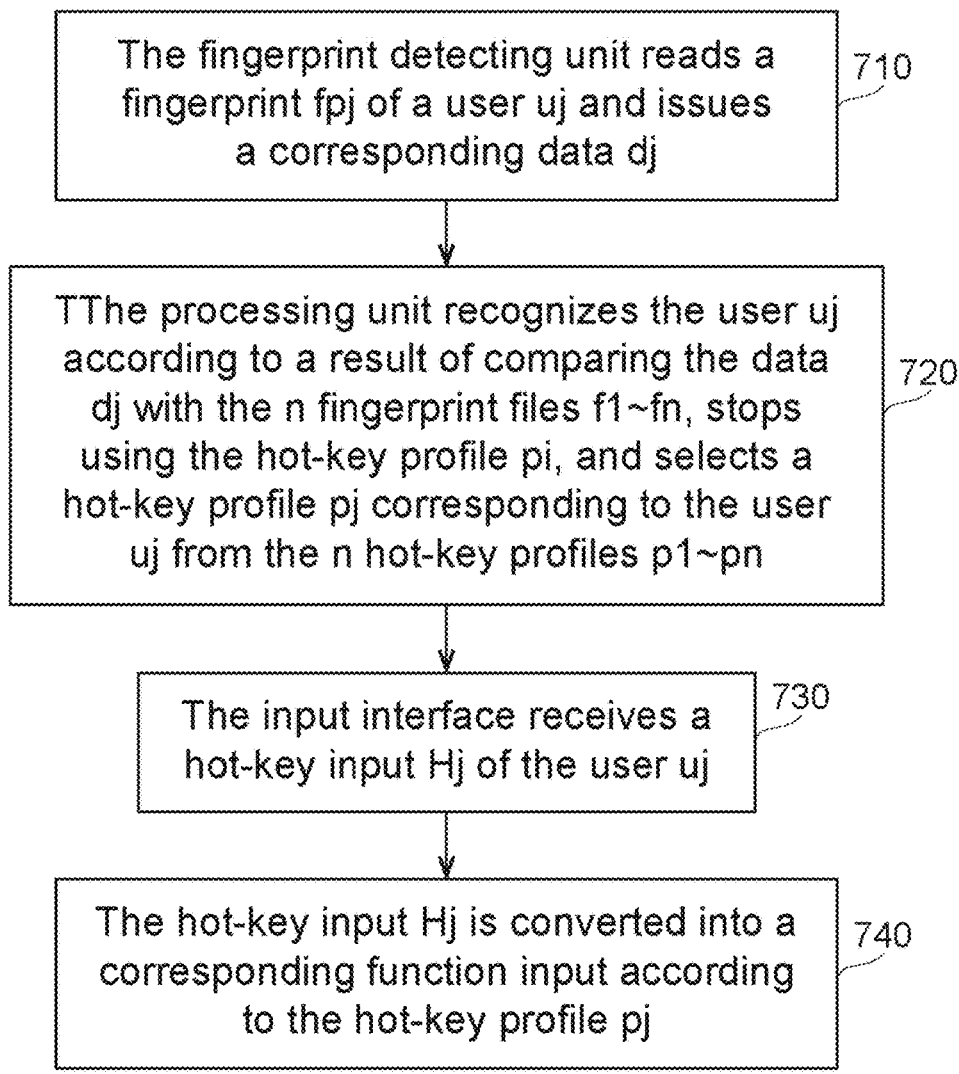
FIG. 7 is a flowchart illustrating the operating method of the input system when the user is changed.

FIG. 6 schematically illustrates another implementation example of the input system according to the embodiment of the present invention. FIG. 7 is a flowchart illustrating the operating method of the input system when the user is changed. Please also refer to FIGS. 3, 4 and 6. The operating method of FIG. 7 comprises the following steps.

In a step 710, the fingerprint detecting unit 120 reads a fingerprint fpj of a user uj and issues a corresponding data dj.

In a step 720, the processing unit 140 recognizes the user uj according to a result of comparing the data dj with the n fingerprint files f1~fn, stops using the hot-key profile pi, and selects a hot-key profile pj corresponding to the user uj from the n hot-key profiles p1~pn.

In a step 730, the input interface 130 receives a hot-key input Hj of the user uj.

In a step 740, the hot-key input Hi into a corresponding function input according to the hot-key profile pj.

The parameter "j" is a positive integer, and 1≤j≤n, and i≠j.

The steps 710~740 are selectively performed after the step 340. The principle and example of the operating method of FIG. 7 when the user is changed are similar to those mentioned above, and are not redundantly described herein.

From the above descriptions, the input system and the operating method of the present invention can facilitate the user to create hot-key macro instructions corresponding to the widely-used and complicated inputs by using the hot-key settings of the hot-key profiles. Consequently, the user can operate the input system to input the desired contents more accurately and conveniently. Moreover, the input system of the present invention can support plural users. According to the detected fingerprints, plural users are allowed to use the hot-key profiles that are edited by them. Consequently, the input system is applicable to the home users or team users. Through the settings of function modes, the user can manage the hot-key settings more easily. Consequently, the input system is more user-friendly. In other words, the present invention is effective to overcome the drawbacks of the conventional technologies.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An input system, comprising:
    a memory unit storing n hot-key profiles and n fingerprint files corresponding to the n hot-key profiles;
    a fingerprint detecting unit reading a fingerprint of a first user and issuing a first data corresponding to the fingerprint of the first user;
    an input interface receiving a first hot-key input of the first user; and
    a processing unit connected with the memory unit, the fingerprint detecting unit and the input interface, wherein the processing unit recognizes the first user according to a result of comparing the first data with the n fingerprint files, selects a first hot-key profile corresponding to the first user from the n hot-key profiles, and converts the first hot-key input into a first function input according to the first hot-key profile;
    wherein each of the n hot-key profiles records m hot-key settings, each of the m hot-key settings is a macro instruction corresponding to one hot-key input and one function input, and n and m are integers greater than 1; and
    wherein each of the n hot-key profiles has a total of a function modes, and each of the plural function modes corresponds to b hot-key settings, wherein a and b are positive integers, a and/or b is greater than 1, and m=a×b.

2. The input system according to claim 1, further comprising a time counter connected with the processing unit, wherein after no input is received by the input interface, the time counter starts to count time, wherein when an input is received by the input interface again, the time counter stops counting time and the time counter is zeroed, wherein if no input has been received by the input interface for a time period longer than a threshold value according to a counting result of the time counter, the processing unit stops using the first hot-key profile.

3. The input system according to claim 1, wherein the fingerprint detecting unit further reads a fingerprint of a second user and issues a second data corresponding to the fingerprint of the second user, and the input interface further receives a second hot-key input of the first user, wherein the processing unit recognizes the second user according to a result of comparing the second data with the n fingerprint files, selects a second hot-key profile corresponding to the second user from the n hot-key profiles, and converts the second hot-key input into a second function input according to the second hot-key profile.

4. The input system according to claim 1, wherein after the first user is recognized, the first hot-key profile is set to be in an editing mode by the processing unit, so that the first user is allowed to edit the first hot-key profile.

5. The input system according to claim 1, wherein the input interface includes a keyboard, a mouse, a joystick, an audio input device and/or a handheld controller.

6. The input system according to claim 1, wherein the memory unit is included in a host.

7. The input system according to claim 1, wherein the memory unit and the input interface are integrated into an input device.

8. The input system according to claim 1, further comprising a non-transitory computer-readable medium, wherein after the processing unit reads the non-transitory computer-readable medium, the processing unit recognizes the first user according to the result of comparing the first data with the n fingerprint files, selects the first hot-key profile corresponding to the first user from the n hot-key profiles, and converts the first hot-key input into the first function input according to the first hot-key profile.

9. The input system according to claim 8, wherein the non-transitory computer-readable medium is stored in the memory unit.

10. An operating method of an input system, the input system comprising a memory unit, a fingerprint detecting unit and an input interface, the memory unit storing n hot-key profiles and n fingerprint files corresponding to the n hot-key profiles, the operating method comprising steps of:

the fingerprint detecting unit reading a fingerprint of a first user and issuing a first data corresponding to the fingerprint of the first user;

recognizing the first user according to a result of comparing the first data with the n fingerprint files, and selecting a first hot-key profile corresponding to the first user from the n hot-key profiles;

the input interface receiving a first hot-key input of the first user; and converting the first hot-key input into a first function input according to the first hot-key profile;

wherein each of the n hot-key profiles records m hot-key settings, each of the m hot-key settings is a macro instruction corresponding to one hot-key input and one function input, and n and m are integers greater than; and wherein each of the n hot-key profiles has a total of a function modes, and each of the plural function modes corresponds to b hot-key settings, wherein a and b are positive integers, a and/or b is greater than 1, and $m = a \times b$.

11. The operating method according to claim 10, wherein the input system further comprises a time counter, and the operating method further comprises steps of:

the time counter starting to count time after no input is received by the input interface; and if no input has been received by the input interface for a time period longer than a threshold value, stopping using the first hot-key profile.

12. The operating method according to claim 10, further comprising steps of:

the fingerprint detecting unit reading a fingerprint of a second user and issuing a second data corresponding to the fingerprint of the second user;

recognizing the second user according to a result of comparing the second data with the n fingerprint files, and selecting a second hot-key profile corresponding to the second user from the n hot-key profiles;

the input interface receiving a second hot-key input of the second user; and converting the second hot-key input into a second function input according to the second hot-key profile.

13. The operating method according to claim 10, wherein after the first user is recognized, the first hot-key profile is set to be in an editing mode by the processing unit, so that the first user is allowed to edit the first hot-key profile.

* * * * *